United States Patent
Tsai et al.

(10) Patent No.: US 11,033,361 B2
(45) Date of Patent: Jun. 15, 2021

(54) METHODS FOR ORTHODONTIC TREATMENT PLANNING WITH AUGMENTED VISUAL ANALYSIS

(71) Applicant: Ormco Corporation, Orange, CA (US)

(72) Inventors: Evan Yifeng Tsai, Rancho Cucamonga, CA (US); Bindu Saran A. P. A., Irvine, CA (US); Barteld Wind, Newport Beach, CA (US)

(73) Assignee: Ormco Corporation, Orange, CA (US)

( * ) Notice: Subject to any disclaimer, the term of this patent is extended or adjusted under 35 U.S.C. 154(b) by 97 days.

(21) Appl. No.: 16/165,739

(22) Filed: Oct. 19, 2018

(65) Prior Publication Data
US 2019/0117337 A1    Apr. 25, 2019

Related U.S. Application Data

(60) Provisional application No. 62/574,701, filed on Oct. 19, 2017.

(51) Int. Cl.
*A61C 7/00* (2006.01)
*G06K 9/00* (2006.01)
(Continued)

(52) U.S. Cl.
CPC .......... *A61C 7/002* (2013.01); *G06K 9/00268* (2013.01); *G06K 9/6201* (2013.01);
(Continued)

(58) Field of Classification Search
CPC ..... G06T 11/60; G06T 19/20; G06T 2210/41; G06T 2219/2004; G06T 2219/2012; G06T 2219/2016; G06T 2219/2021
See application file for complete search history.

(56) References Cited

U.S. PATENT DOCUMENTS 3,838,187 A * 9/1974 Thomas ................. A61C 9/002
                                                                    264/17
8,465,280 B2    6/2013 Sachdeva et al.
(Continued)

FOREIGN PATENT DOCUMENTS

| WO | 2015079086 A1 | 6/2015 |
| WO | 2015123759 A1 | 8/2015 |
| WO | 2016003255 A2 | 1/2016 |

*Primary Examiner* — Dominic E Rego
(74) *Attorney, Agent, or Firm* — Wood Herron & Evans LLP

(57) ABSTRACT

Methods for orthodontic treatment planning include modifying a digital picture of a patient based on a tooth model produced during simulated orthodontic treatment after movement of at least one model tooth to produce a modified digital image depicting the at least one model tooth after movement. The method includes matching and morphing information from the digital picture into the modified digital image. Modifying includes matching a model tooth in the T1 model to a tooth in the digital picture and morphing that information into the modified digital image. Morphing may include projecting a model tooth in the T1 model to an image plane of the digital picture and projecting a model tooth from an intermediate T model to the image plane. Parameterization of the projections of each model may be used to develop a pixel correspondence map, which is usable during rendering of a tooth in the modified digital image.

18 Claims, 20 Drawing Sheets

(51) Int. Cl.
*G06K 9/62* (2006.01)
*G06T 19/20* (2011.01)
*G06T 11/60* (2006.01)

(52) U.S. Cl.
CPC .............. *G06T 11/60* (2013.01); *G06T 19/20* (2013.01); *G06T 2210/41* (2013.01); *G06T 2219/2004* (2013.01); *G06T 2219/2012* (2013.01); *G06T 2219/2016* (2013.01); *G06T 2219/2021* (2013.01)

(56) References Cited

U.S. PATENT DOCUMENTS

| | | |
|---|---|---|
| 9,144,472 B2 | 9/2015 | Isaacson et al. |
| 10,098,709 B1 | 10/2018 | Kitching et al. |
| 2003/0049585 A1* | 3/2003 | Severance .............. A61C 19/10 433/29 |
| 2006/0181719 A1* | 8/2006 | Aoki .................... H04N 1/6052 358/1.9 |
| 2009/0017421 A1* | 1/2009 | Letcher ................ A61C 8/0048 433/201.1 |
| 2010/0183523 A1* | 7/2010 | Wagner .................. A23K 50/42 424/50 |
| 2010/0188704 A1* | 7/2010 | Hoarau .............. H04N 1/32133 358/1.16 |
| 2011/0143312 A1* | 6/2011 | McAdams .............. A61L 15/28 433/138 |
| 2013/0226534 A1* | 8/2013 | Fisker .................... B33Y 50/00 703/1 |
| 2014/0122027 A1 | 5/2014 | Andreiko et al. |
| 2014/0134566 A1* | 5/2014 | Lemke ................ A61C 8/0068 433/29 |
| 2014/0329194 A1* | 11/2014 | Sachdeva ............... A61C 7/002 433/24 |
| 2014/0348393 A1* | 11/2014 | Kogan ............... H04N 1/00068 382/112 |
| 2017/0049311 A1* | 2/2017 | Borovinskih .......... A61C 7/002 |
| 2017/0124385 A1* | 5/2017 | Ganong .............. G06Q 30/0241 |
| 2018/0008384 A1* | 1/2018 | Schulter .................. C08L 33/08 |
| 2018/0165818 A1 | 6/2018 | Tsai et al. |
| 2018/0263731 A1* | 9/2018 | Pokotilov ............... G06T 17/20 |
| 2018/0314878 A1* | 11/2018 | Lee ......................... G06T 11/60 |
| 2020/0000551 A1* | 1/2020 | Li .......................... G16H 50/50 |

* cited by examiner

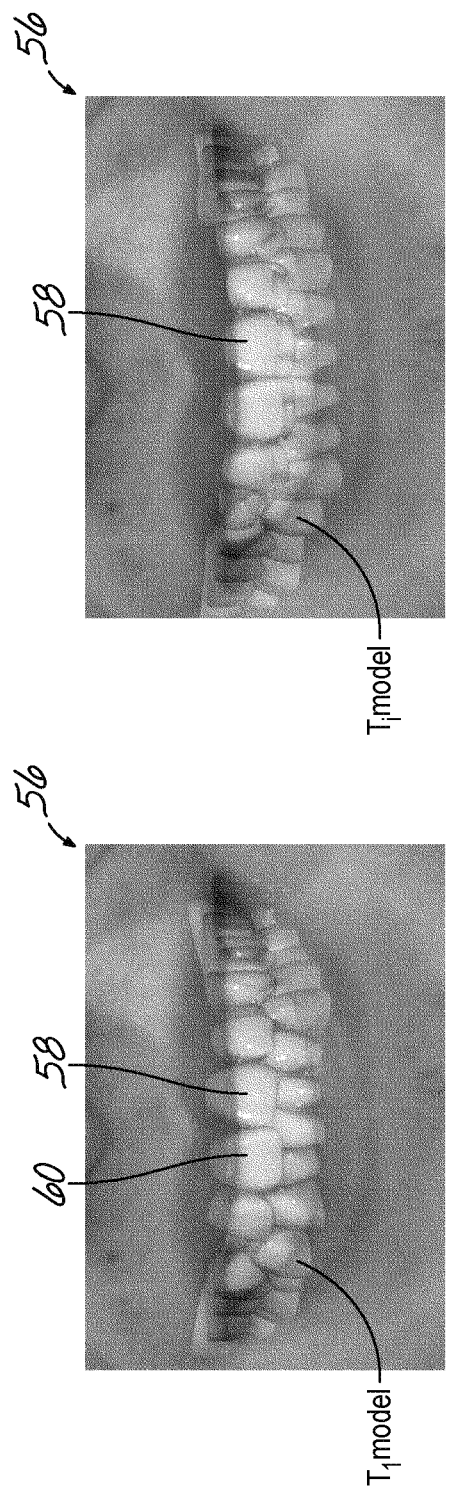

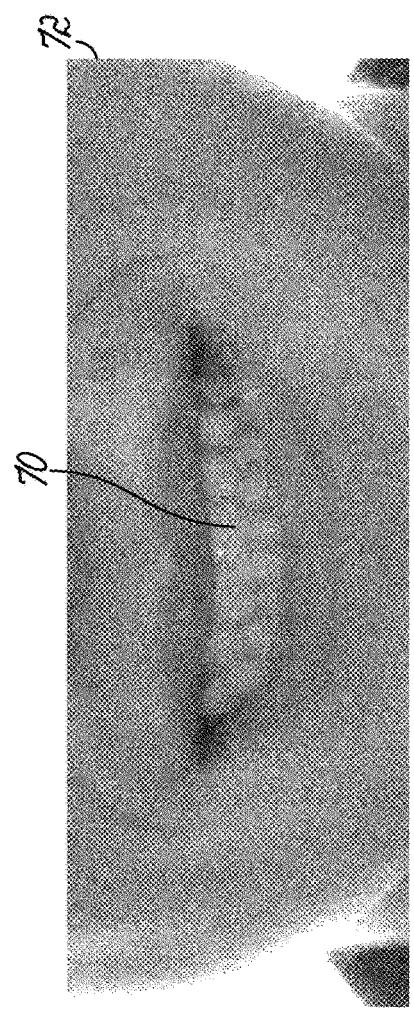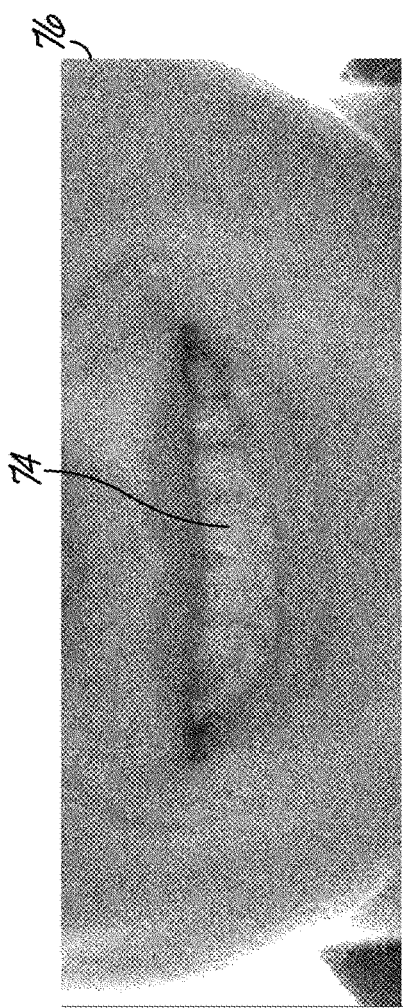
FIG. 7A
FIG. 7B

METHODS FOR ORTHODONTIC TREATMENT PLANNING WITH AUGMENTED VISUAL ANALYSIS

CROSS REFERENCE

This application claims the benefit of U.S. Provisional Patent Application Ser. No. 62/574,701 filed on Oct. 19, 2017, the disclosure of which is expressly incorporated by reference herein in its entirety.

TECHNICAL FIELD

The present invention relates generally to computerized techniques for orthodontic treatment planning and, more particularly, to interactive computerized techniques for facilitating integration of treatment planning with patients' pictures.

BACKGROUND

Orthodontic treatment to correct malocclusions of a patient's teeth may include various types of image capture and image analysis. These images may include 2-D and 3-D images of the patient's teeth. That image information may be utilized by an orthodontist to prepare a treatment plan by which the patient's teeth are reoriented into more aesthetically pleasing positions.

To that end, the data from the images may be analyzed so that a desired, aesthetically pleasing position of each tooth can be determined. The treatment plan is developed to take the patient's teeth from their initial, maloccluded positions to their desired positions. The treatment plan may ultimately be utilized to manufacture orthodontic brackets or aligners specifically designed to produce the predetermined movement of the teeth from their initial positions to their final positions.

During treatment plan development, image data is digitally manipulated on a computer. The image data may be in the form of a virtual 3-D model of the patient's teeth. A digital setup is developed prior to manufacturing orthodontic brackets or aligners from the 3-D model.

While the positions and orientations of each tooth in the digital 3-D model have significant meaning to an orthodontist, these models, which typically depict only the patient's teeth, do not usually provide the patient with any idea about how he or she will look following treatment. Most patients want to know what their smile will look like following treatment. This visual analysis is not possible because these digital models lack facial feature information. It is difficult for patients to imagine changes in their facial features after treatment by just viewing model teeth.

One solution for providing a patient with a preview of their post-treatment smile includes a photo editing thought process. A technician takes a frontal picture of the patient smiling. The picture may be taken with a digital camera so that the patient's image is two-dimensional and contains a fixed number or rows and columns of pixels with each pixel storing information related to the patient's likeness. That initial frontal smiling picture is manually manipulated, possibly by editing the outlines of the patient's teeth, the patient's lip contours, the patient's gum lines, and other facial features, to arrive at one possible post-treatment preview of the patient's face, including their smile. There are many disadvantages to this photo editing process.

For one, photo editing incorporates the technician's imagination and may be significantly limited by the technician's editing skills and lack of experience and the lack of available information on the teeth other than those visible in the initial frontal smiling picture. The resulting preview of the patient's post-treatment smile may not represent an obtainable reality. In general, photo editing results in a disconnect between the modified picture and actual orthodontic treatment.

Another solution involves a 3-D virtual reconstruction of the patient's face. That virtual reconstruction can be displayed to the patient so the patient may more fully appreciate a treatment outcome. By way of example, one such virtual reconstruction is described in U.S. Pat. No. 8,465,280. However, one likely drawback to the process described in that U.S. Patent is that it requires perfect execution. In the event that too many unknowns exist, perfect execution may be extremely challenging. Small miscalculations in the morphing of bone structures, the deformation of the gingiva, and the stretching of the facial tissues, among other facial features, could render the virtual reconstruction of the patient's face looking odd or even scary. Ultimately, the virtual reconstruction may look nothing like the patient's face following orthodontic treatment.

What is needed in orthodontic treatment planning is a way of simulating the effect of orthodontic treatment that includes facial features to aid in communicating a treatment result with a patient.

SUMMARY

The present invention overcomes the shortcomings and drawbacks in the methods and systems for modeling and treatment planning heretofore known for use in orthodontic treatment. While the invention will be described in connection with certain embodiments, it will be understood that the invention is not limited to those embodiments. On the contrary, the invention includes all alternatives, modifications and equivalents as may be included within the spirit and scope of the present invention.

In accordance with the principles of the present invention, a method of orthodontic treatment planning includes modifying a digital picture of a patient based on a tooth model produced during simulated orthodontic treatment after movement of at least one model tooth to produce a modified digital image depicting the at least one model tooth after movement.

In one embodiment, the method further includes identifying and extracting at least one facial feature from the digital picture.

In one embodiment, during modifying, only information from the at least one extracted feature is incorporated into the modified digital image.

In one embodiment, a T1 model is based on captured 3-D data of the patient's teeth, and modifying includes matching a model tooth in the T1 model to a corresponding tooth in the digital picture.

In one embodiment, matching includes superimposing the T1 model and the digital picture in digital space.

In one embodiment, after matching, the method further includes projecting at least one model tooth in the T1 model to an image plane of the digital picture.

In one embodiment, the method further includes orienting an intermediate T model with the at least one model tooth being moved relative to the at least one model tooth in the T1 model. During orienting, the intermediate T model is placed in the same orientation as the T1 model after matching. The method further includes projecting the at least one model tooth in the intermediate T model to the image plane.

In one embodiment, the intermediate T model is a tooth model between the T1 model and a T2 model.

In one embodiment, the projections in the image plane each include a plurality of elements and the method further includes parameterizing each element in one projection with a corresponding element in the other projection.

In one embodiment, the method further includes creating a pixel correspondence map between the parameterized elements.

In one embodiment, the elements are assigned one or more pixels, and the method further includes relocating color from one or more pixels in one projection to one or more pixels in the other projection based on the pixel correspondence map.

In one embodiment, the method further includes rendering the at least one model tooth in the modified digital image with color relocated according to the pixel correspondence map.

In one embodiment, relocating color utilizes only color information found in the digital picture.

In one embodiment, the method further includes applying a matching transformation to an intermediate T model with the at least one model tooth being moved relative to the at least one model tooth in the T1 model, and projecting the at least one model tooth in the intermediate T model to the image plane.

In one embodiment, the digital picture is a frontal picture with the patient smiling.

In one embodiment, modifying the digital picture includes modifying at least two digital pictures. In one embodiment, the at least two digital pictures include a lateral view picture and a frontal view picture.

In one embodiment, during modifying, only color found in the digital picture is used to color the modified digital image.

In one embodiment, modifying includes adding gingiva to the modified digital image at a location at which no gingiva is visible in the digital picture.

In one embodiment, modifying includes changing a facial feature of the patient in the modified digital image relative to the digital picture.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

FIGS. 5A and 5B depict a projection of an initial dental model (T1) onto an image plane of a patient's picture and a projection of one intermediate model (Ti) onto the image plane of the patient's picture, respectively.

FIGS. 7A and 7B illustrate a modified digital image (FIG. 7B) in which the patient's teeth are shown in their positions and orientations according to the intermediate model (Ti) shown in FIG. 5B.

DETAILED DESCRIPTION

To those and other ends and with reference generally to the figures, methods and systems of augmenting a digital picture to produce a modified digital image are described. In general, a digital picture of a patient's face before orthodontic treatment may be modified in a manner that tracks model tooth movement during simulated orthodontic treatment. In addition to accounting for model tooth movement, the modified digital image may include changes in the patient's facial features due to that tooth movement. The modified digital image represents a preview of the patient's face, including the patient's smile, in advance of actual orthodontic treatment. The patient is then able to observe changes in their smile and other facial features as a result of any proposed orthodontic treatment.

Like the pre-treatment digital picture of the patient's face, the modified digital image may be a two-dimensional digital image. However, the modified digital image may incorporate facial feature changes predicted from repositioned/reoriented model teeth though, in one embodiment, only the colors in the original picture are used in the modified digital image. The modified digital image does not represent reality. Advantageously, however, a patient can see a realistic, objective end result (i.e., their smile) of an orthodontic treatment plan prior to implementation of any particular treatment plan. In view of the methods described in the Background above, embodiments of the present invention neither derive a patient's post-treatment facial features from photo editing alone or from an all-inclusive virtual face model.

Figure 1:
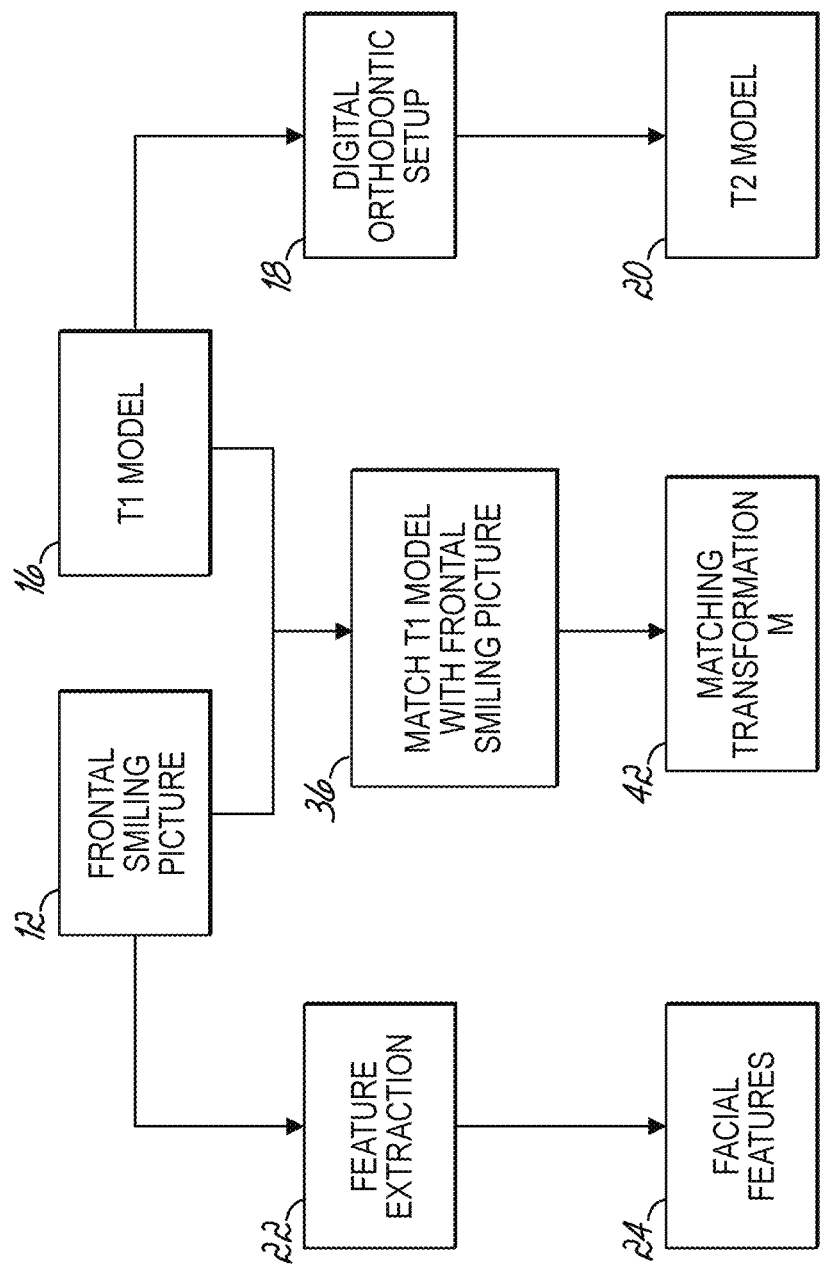
FIG. 1 is a flowchart of processing and matching a model and a picture according to one embodiment of the invention.
Figure 2:
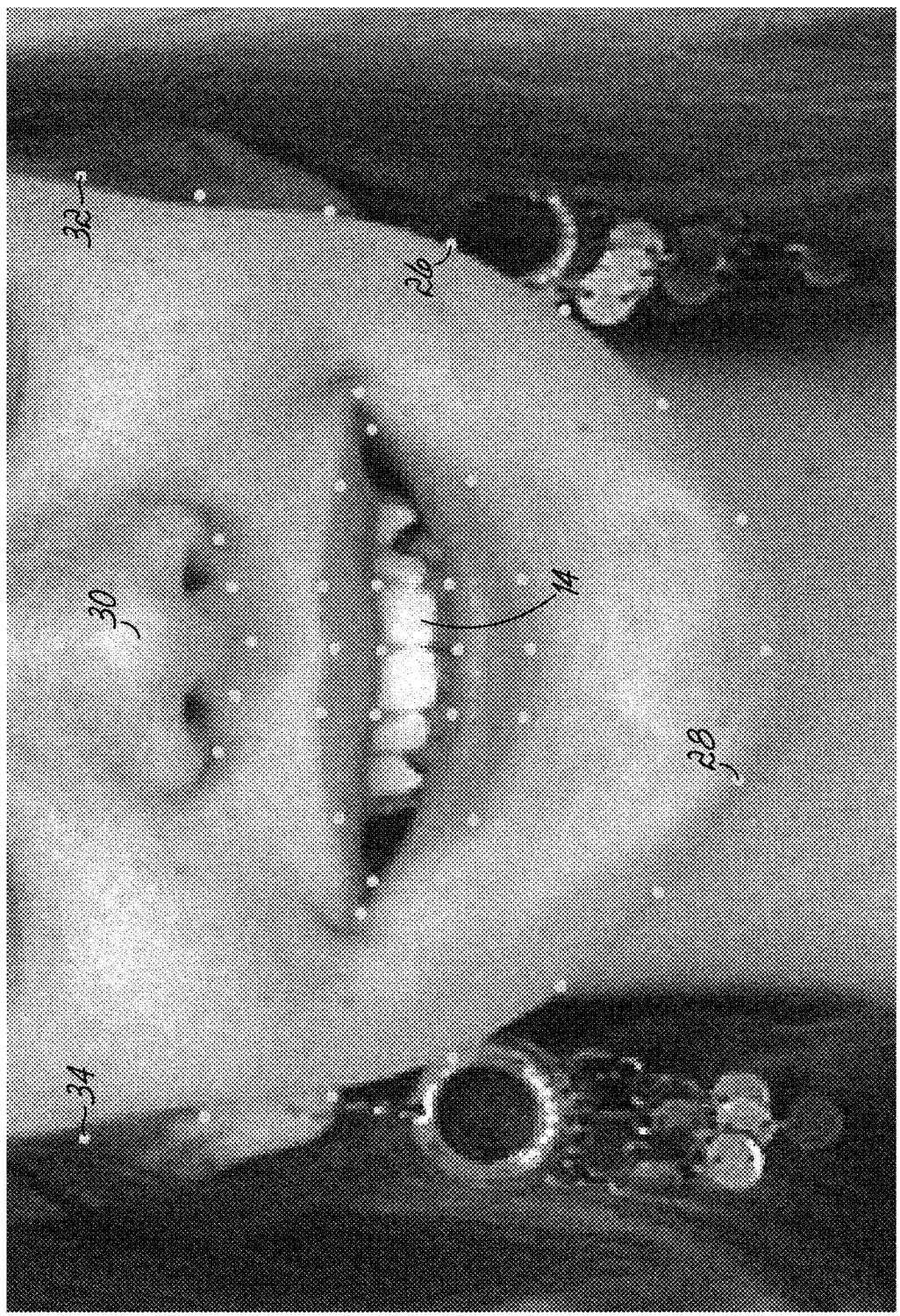
FIG. 2 is a picture depicting identification of facial features of a patient according to one embodiment of the invention.
Figure 3:
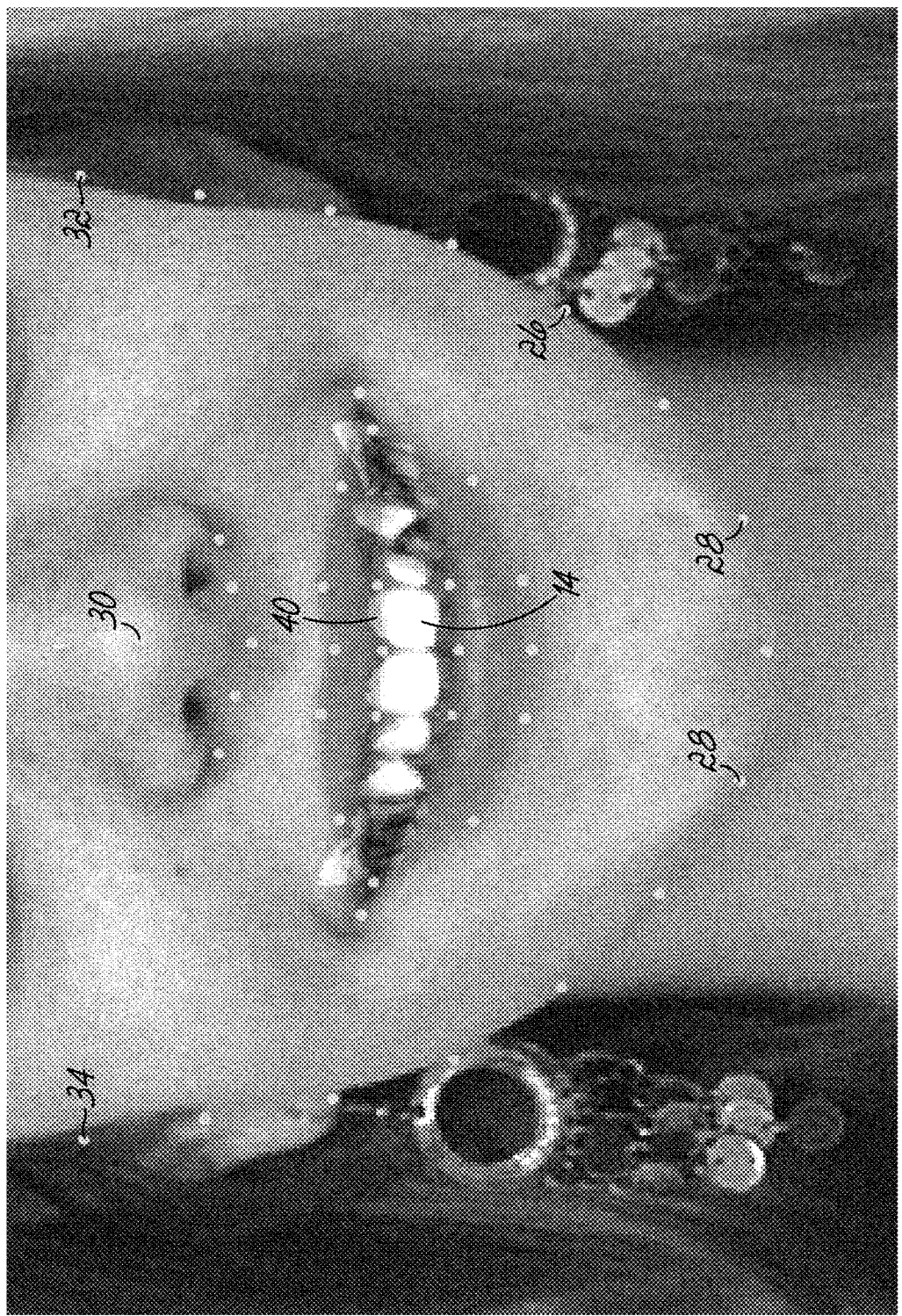
FIG. 3 is a modified version of the picture shown in FIG. 2 following initial processing matching of the picture and an initial dental model (T1) according to one embodiment of the invention.

With reference to FIGS. 1-3, in one embodiment of the invention, a clinician may take a patient's frontal digital picture 10 at an initial step 12. As shown in FIG. 2, the frontal picture 10 is a digital picture that includes two-dimensional digital information of the patient's facial features. The digital picture 10 captures the patient's actual facial features at a moment in time.

Although not shown in color, each of the digital pictures includes color information associated with each pixel. When smiling, the patient's teeth 14 are visible.

The frontal digital picture 10 may be pre-processed at 22 (FIG. 1) to identify and extract the patient's facial features 24. The patient's facial features 24 may include lip contours 26, gum lines 28, nose shape 30, and head shape 32, to name only a few. As is shown in FIG. 2, by way of example these features 24 may be collectively outlined by separate sets of dots 34. Embodiments of the invention are not limited to the features described or by sets of dots. Various methods may be utilized to automatically or semi-automatically identify the patient's facial features 24.

With reference to FIG. 1, the clinician also captures images of the patient's teeth via intra-oral scans at 16 or via another method (e.g., using a mold to prepare a plaster model of the patient's teeth and then scanning the plaster model) for obtaining three-dimensional data regarding the position and orientation of a plurality of the patient's teeth. The 3-D data may include image data of only the crowns of the patient's teeth and/or image data of the crowns and the roots of the patient's teeth, such as by CBCT scans. The scans capture image data from which the clinician can produce a 3-D model of the patient's teeth before treatment. This 3-D model is typically referred to as the "T1 model" (FIG. 1 at 16). Systems and computers usable in orthodontic treatment planning in accordance with embodiments of the invention are disclosed in commonly owned U.S. Pat. No. 10,098,709 and U.S. Publication No. 2018/0165818 which are each incorporated by reference herein in their entireties.

As shown in FIG. 1, a digital orthodontic setup or "T2 model" at 20 is then computed at 18 utilizing data in the T1 model. Like the T1 model, the T2 model is a 3-D model. Whereas the T1 model represents a pre-treatment virtual arrangement of the patient's teeth, the T2 model represents an after-treatment arrangement of the virtual teeth shown in the T1 model. By way of example only and not limitation, the digital orthodontic setup may be created by manipulating the image data in the Insignia™ system available from Ormco Corporation, Orange, Calif. The digital orthodontic setup is the actual data set that may ultimately be used to instruct a manufacturer on the design of custom orthodontic appliances. The digital orthodontic setup is a virtual representation that corresponds exactly to the outcome of orthodontic treatment.

With reference to FIGS. 1 and 3, in one embodiment, at 36, the model teeth of the T1 model are matched with the teeth 14 shown in the frontal picture 10. Each of the model teeth of the T1 model and the teeth 14 in the frontal picture 10 represent the patient's teeth positions before orthodontic treatment. Alignment is shown in FIG. 3 in which a plurality of anterior model teeth 40 are matched tooth for tooth to the anterior teeth 14 visible in the frontal picture 10. In this manner, the two sets of data, that is, the data of the model teeth 40 and the data associated with the teeth 14 in the frontal picture 10 are matched in a visually accurate manner. The matching process may include superimposing the T1 model in the same space as the frontal picture 10. Once in the same space, the relative positions of the frontal picture 10 and the T1 model are rotated and scaled in all degrees of freedom with respect to an image plane established by the frontal picture 10.

As shown in FIG. 3, as a result of matching, the outlines of the model teeth 40 and the teeth 14 are visually coincident in the image plane. That is, when superimposed, the model teeth 40 and the teeth 14 in the picture 10 appear as a single tooth in view space. Matching between the T1 model and the frontal picture 10 may be achieved manually by a technician or through an automatic algorithm that utilizes pattern recognition techniques. Matching provides a matching transformation, M, at 42 in FIG. 1.

By way of example only and not limitation, an algorithm may be used to match the model teeth in the T1 model to the teeth 14 in the frontal picture 10 to produce the matching transformation, M. With reference to FIGS. 3A-3E, matching may include identifying an inner lip line 44. This may be an automatic process performed by an algorithm and/or a manual process in which a clinician manually adjusts a manual lip line 46 to visually follow the inner lip line 44 in the frontal picture 10. Defining the inner lip line 44, enables the algorithm to focus the matching process on the teeth 14 within that boundary.

Figure 3A:
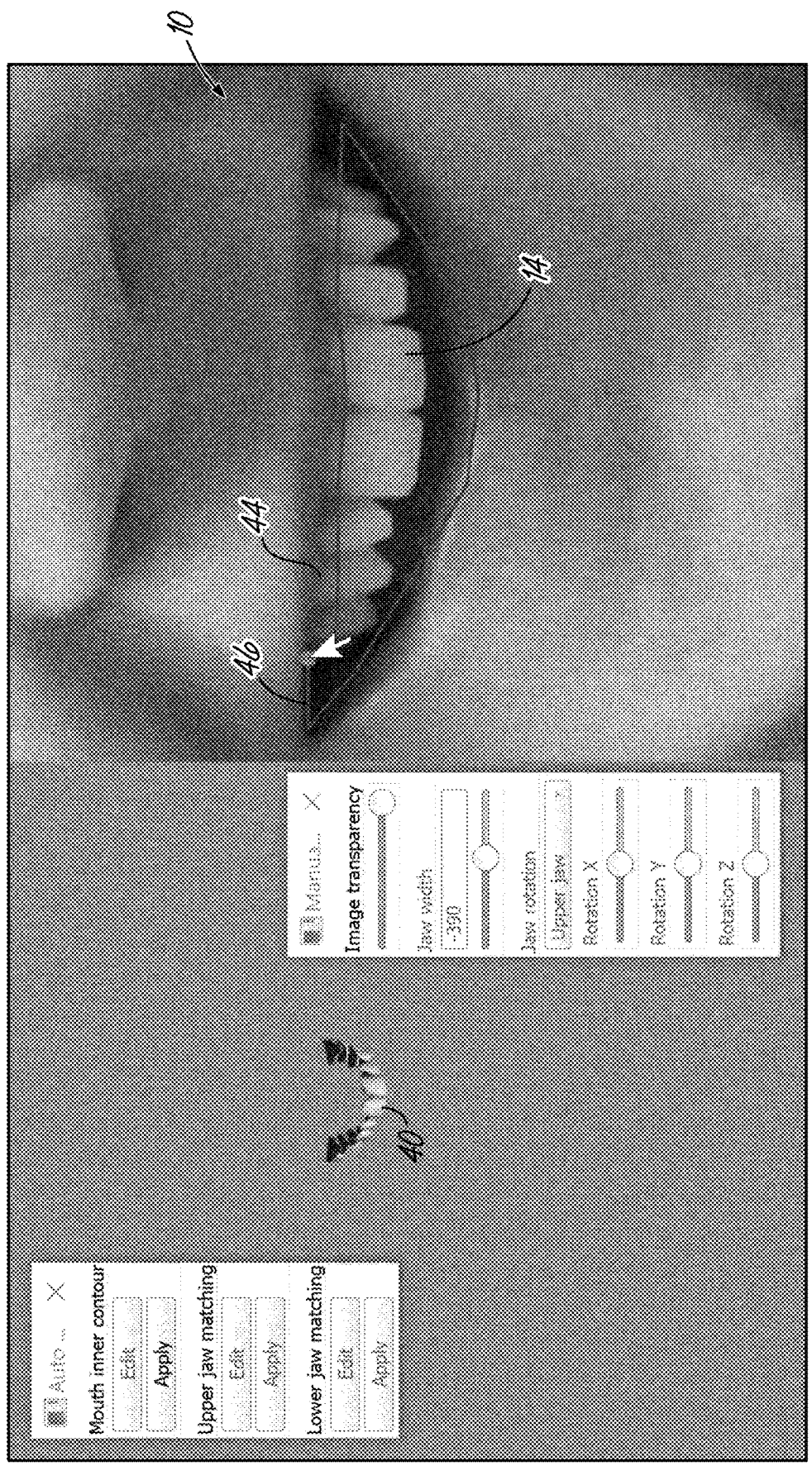
FIGS. 3A, 3B, 3C, 3D, and 3E are screen shots depicting matching of a tooth model to a picture.
Figure 3B:
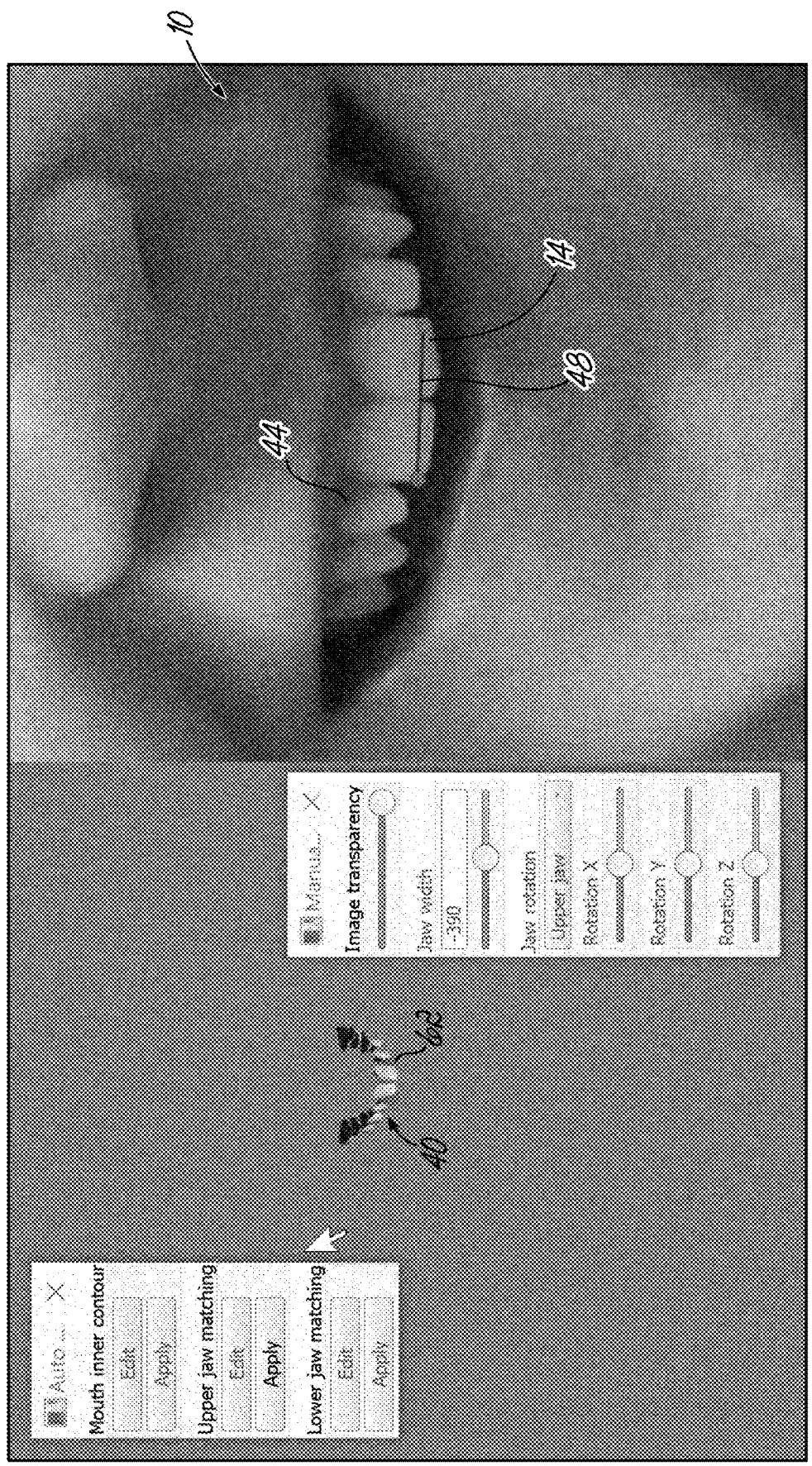

Referring now to FIG. 3B, the matching process may include scaling the teeth of the T1 model to fit the teeth 14 of the frontal picture 10. Scaling may include selecting a dimension in each of the T1 model and the picture 10 that represent the same physical dimension. One or both of these dimensions are then adjusted so that the two dimensions are equal. For example, a width dimension 48 across the anterior incisors is selected in the picture 10, and a corresponding width dimension 62 across the anterior incisors is selected in the T1 model. The dimensions 48 and 62 are adjusted to be the same by changing the scale of one or both of the T1 model and the picture 10. The result of this scaling process is shown in FIG. 3C.

Figure 3C:
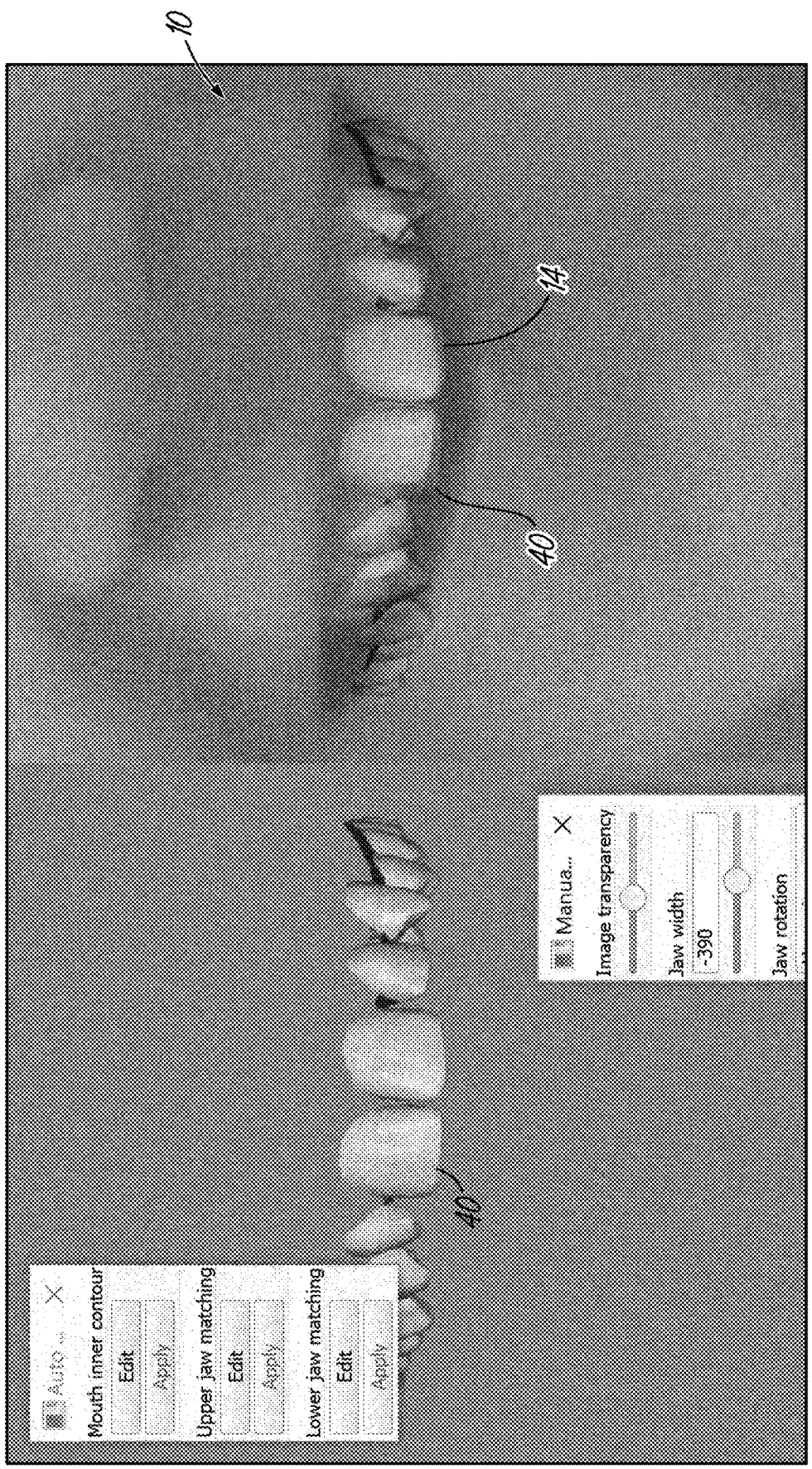
Figure 3D:
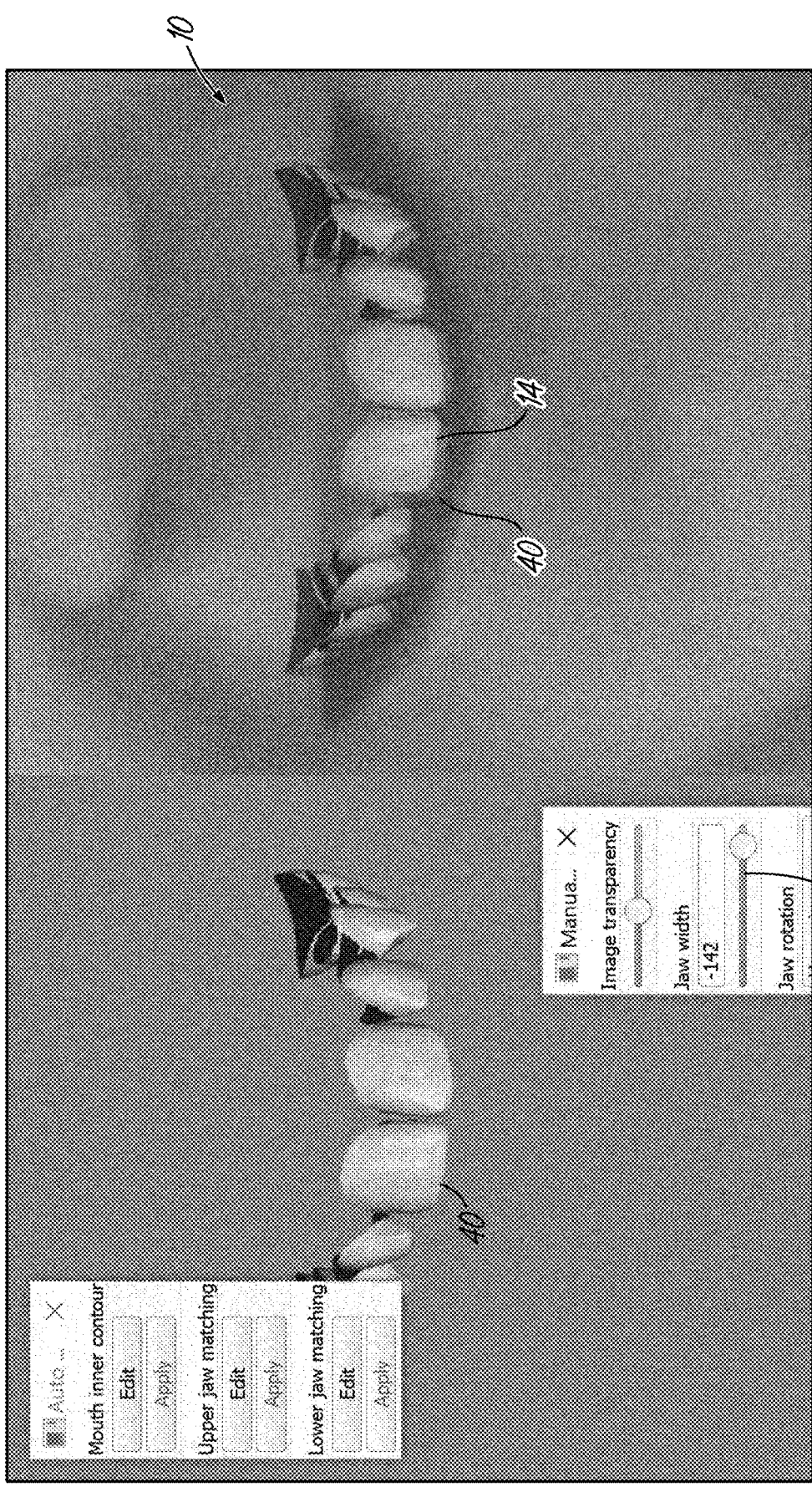
Figure 3E:
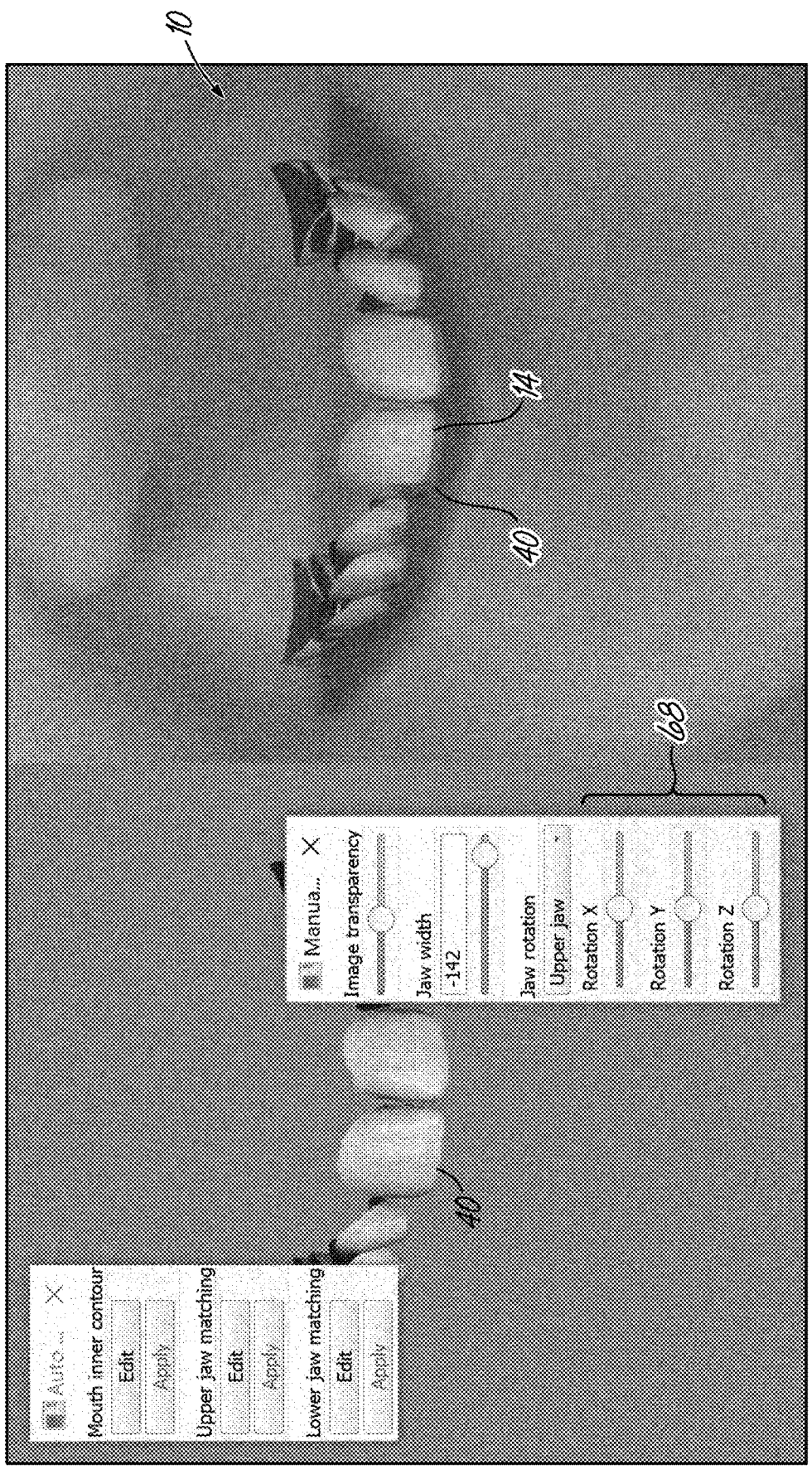

In FIG. 3C, the T1 model is superimposed in the digital space with the frontal picture 10, and the transparency of the T1 model is adjusted so that the position of the T1 model is observable relative to the teeth 14. With reference to FIGS. 3D and 3E, the orientation and position of the T1 model may be further adjusted to visually match the teeth 40 with the teeth 14. For example, in FIG. 3D, a jaw width 66 may be adjusted, which increases or decreases a mesial-distal dimension of the T1 model, and in FIG. 3E, one or more of rotations 68 is adjusted to rotate the T1 model relative to the picture 10 to further visually align the teeth 40 of the T1 model with the teeth 14 of the picture 10.

In addition, or alternatively, the T1 model may be viewed from a different direction, for example from the front and from the side. So, in addition to the picture 10, which is a front view of the patient, a digital picture of the patient from the side is also utilized. Matching at 36 in FIG. 1 may be applied in each of these orientations relative to the T1 model. Alternating visual alignment between these two views (e.g., front and side) and then repeating that alignment process until the total error in each view is minimized is possible. Depending on the accuracy desired, alternating and iterating a single time may achieve the desired accuracy or multiple back and forth iterations may be necessary. In this way, the T1 model and the picture 10 may be properly oriented relative to one another to bring the corresponding teeth 14 and 40 into visual alignment. Referring to FIG. 1 at 42, the matching transformation, M, may be obtained between the T1 model and the frontal picture 10 following matching at 36.

The matching transformation, M, is applicable to the T2 model and to each stage of treatment that repositions the model teeth from the T1 model to the T2 model. In that regard, tooth movement from the T1 model to the T2 model may be broken down into consecutive smaller step-wise transformations of each tooth. For example, there may be 20 smaller stepwise movements of the teeth from their positions in the T1 model to the T2 model. However, other numbers of stages or movements is possible, such as, 10, 30, 40 or more. The number of stages depends on the orthodontic treatment plan. Collectively, the small transformations at each stage produce a morphing (i.e., a movie) that illustrates the T1 model morphing into the T2 model. Each smaller transformation produces an intermediate Ti model, which represents one of the consecutive smaller transformations between the T1 model and the T2 model at the ith timestamp. Twenty stepwise movements may be represented by an intermediate $T_i$ model, $T_{i+1}$ model, $T_{i+2}$ model, etc. Two different intermediate Ti models are shown in FIGS. 4A and 4B.

Figure 4A:
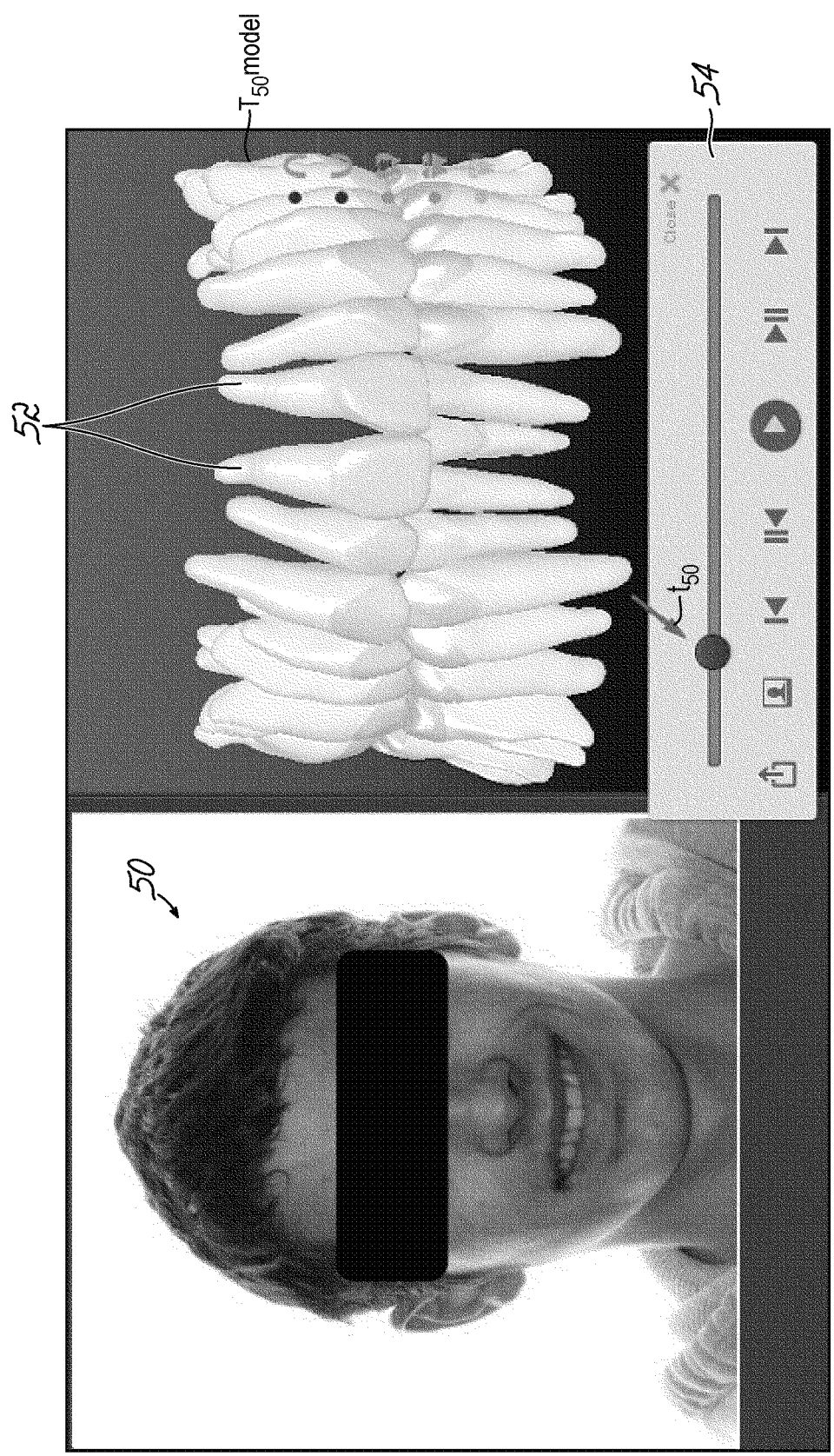
FIG. 4A depicts a modified digital image of a patient that corresponds to an intermediate dental model (Ti).
Figure 4B:
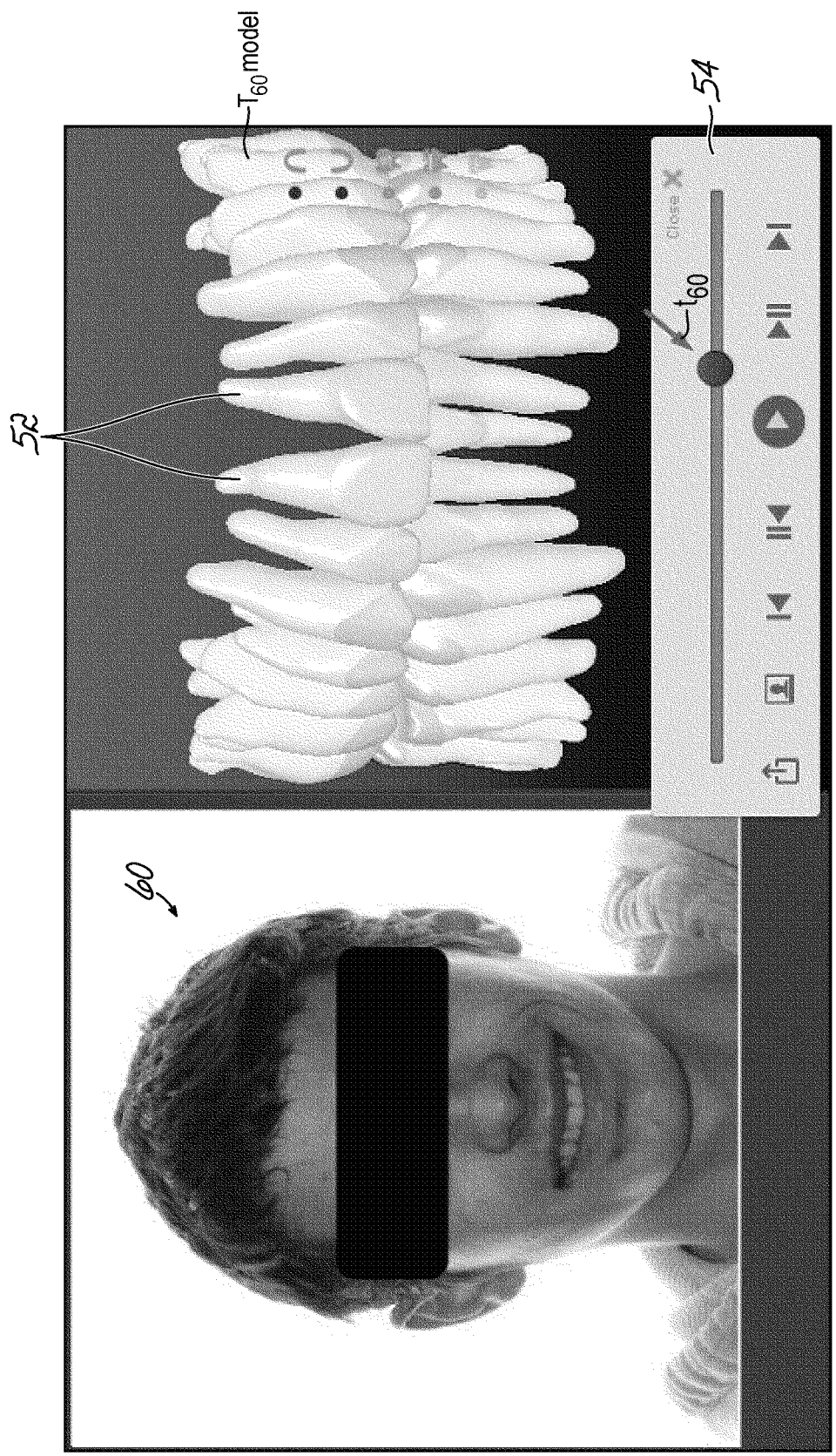
FIG. 4B depicts a modified digital image of the patient shown in FIG. 4A that corresponds to another intermediate dental model (Ti) in which the patient's teeth are in a position closer to a targeted final position represented by a T2 model (T2) that is usable to produce a digital setup for the patient.

Comparing FIG. 4A and FIG. 4B, the intermediate $T_{50}$ model precedes the intermediate $T_{60}$ model during simulation of the treatment plan that moves one or more of the model teeth 52 from the position and/or orientation in the T1 model toward the T2 model. This is illustrated by the respective slider locations at 54. Note that the T1 model would appear with the slider 54 at the left-most location and the T2 model would appear when the slider 54 is at the right-most location.

Figure 9:
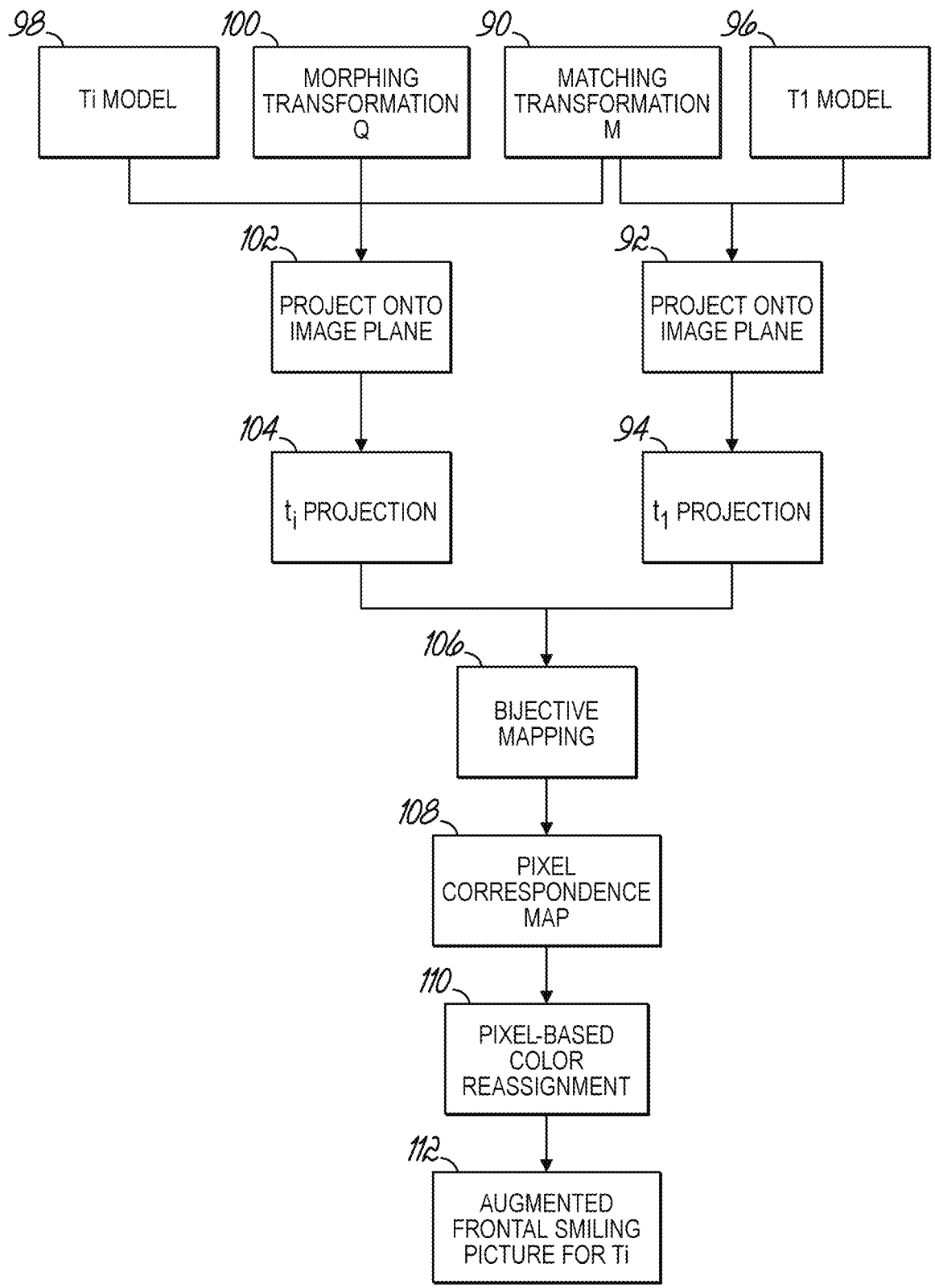
FIG. 9 is a flowchart illustrating a process for augmentation of a digital picture during morphing with an intermediate Ti model (Ti).

In that regard, in FIG. 9, the matching transformation M at 90 is known at least according to the matching process described above with regard to the T1 model and the frontal picture 10. That transformation, M, may be applied to each intermediate $T_i$ model. In general, this application may be represented by the equation:

$$Ti=M*T1,$$

where Ti is the Ti model at the ith timestamp, M is the transformation at the ith timestamp, and T1 is the T1 model. Thus, when applied, M brings the intermediate T model into an orthodontically appropriate orientation in the image plane of the digital picture 10.

According to embodiments of the invention, a morphing transformation, Q, is determined at 100. In one embodiment, Q may be determined between the T1 model and the next intermediate T model, between any two consecutive intermediate T models, and between the immediately preceding intermediate T model to the T2 model and the T2 model. For example, Q may be determined for the T1 model and the next intermediate $T_i$ model.

To that end, once the T1 model is matched to the digital picture 10, as is described above, the model teeth in the T1 model are projected onto a 2-D image plane of the frontal digital picture 10 at 92. Each tooth 40 in the T1 model may be projected onto the 2-D image plane or only those teeth contours within the inner lip line 44 may be projected onto the 2-D image plane at 94 in FIG. 9. Projecting may produce a projection t1 for each tooth shown, for example in FIG. 6.

At 102, the Ti model is also projected onto the image plane of the frontal digital picture. The Ti model can also be visualized against a frontal digital picture through an operation represented by:

$$M*Ti$$

Figure 6:
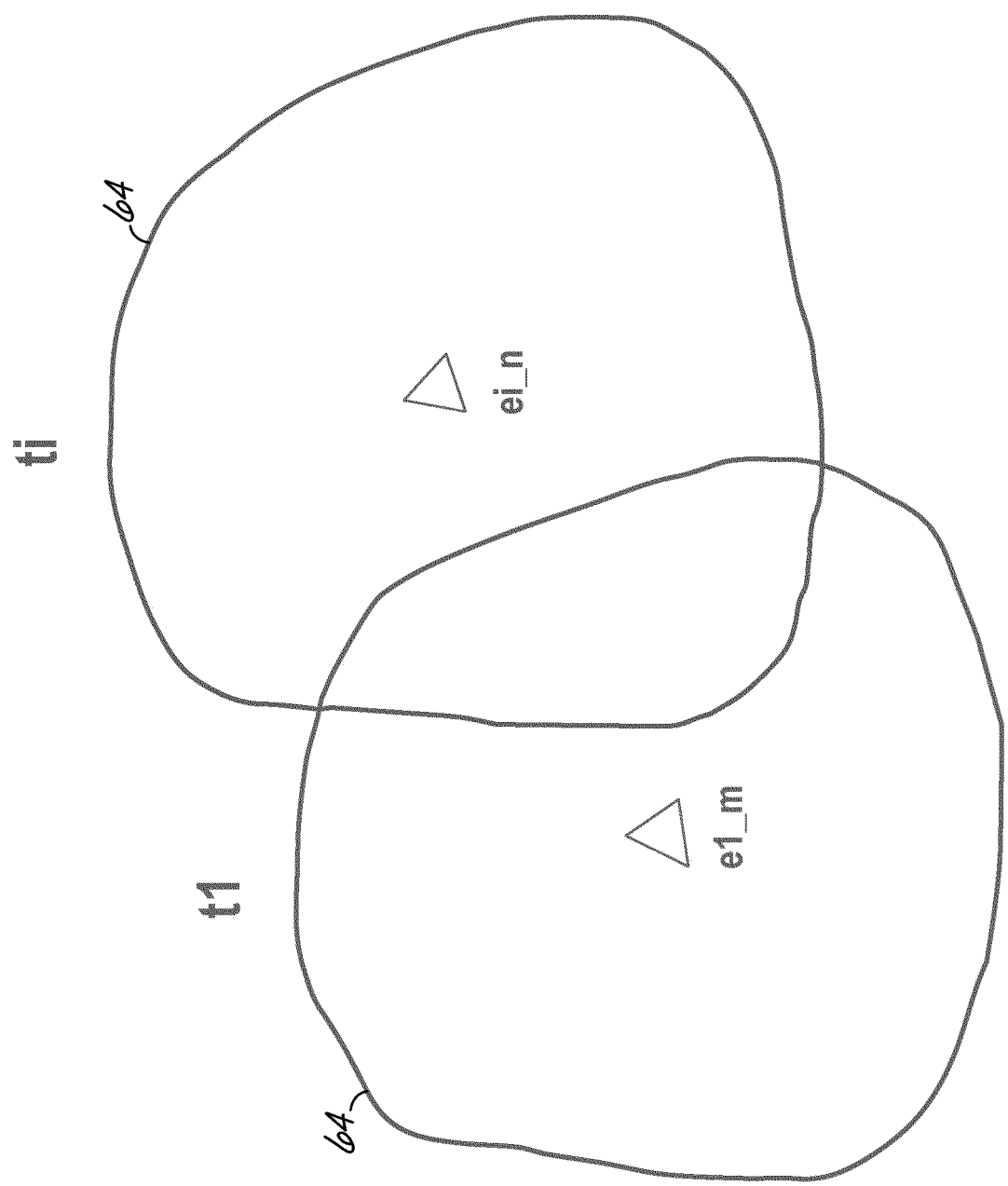
FIG. 6 is a schematic representation of an image of a patient's tooth morphing from a location and orientation in an initial model (T1) to a new location and orientation in the intermediate model (Ti).

In FIG. 9, projecting is applied to the $T_i$ model after M is applied at 104. Projecting the teeth of the Ti model produces a projection ti in FIG. 6. With reference to FIG. 6, as an example, only projections t1 and ti of a single tooth 64 are shown in FIG. 6. It will be appreciated that each of the teeth within the inner lip line 44 may be projected to the 2-D image plane so that morphing may include all teeth visible in the inner lip line 44 (i.e., visible in the frontal picture 10). For example, each tooth in the Ti model may be projected onto the 2-D image plane. Projecting each tooth at 92 and 102 produces a visible contour 64 or outline for each tooth in the 2-D image plane.

FIG. 6 illustrates a projection of an exemplary tooth 64 in the T1 model in an image plane and a projection of the same tooth 64 in the intermediate Ti model in the same image plane. As any tooth moves in 3-D space, its projection onto an image plane may change shape and size depending on the tooth's orientation relative to the image plane. That is the case with the exemplary projections shown in FIG. 6. The same tooth 64 has moved from its original position in the T1 model to a new position in the Ti model. The two projections Ti and T1 are therefore different in at least their respective contours and positions in the plane of FIG. 6.

With reference to FIGS. 6 and 9, in one embodiment, following projection of each tooth or each visible tooth portion of the T1 model and the Ti model on the image plane of the frontal digital picture at 92 and 102 and determination of the projections t1 and ti at 94 and 104, respectively, a correspondence between the two projections t1 and ti is established. In accordance with embodiments of the invention, morphing the tooth 64 from its orientation in the projection t1 to the projection ti accounts for the change in the respective contours of the tooth 64.

In one embodiment, morphing includes changing the orientation of the tooth in a modified digital image and objectively coloring that tooth based on the colors of that tooth in the frontal digital picture 10. With reference to FIG. 6, the shape and location bounded by the projection ti is different from the shape and location bounded by the projection t1 even though each projection is a representation of the same tooth 64. Each of the contours defined by the projections t1 and ti may be parameterized to provide individual elements e1_m and ei_n, respectively.

The individual elements e1 and ei are single elements of a plurality of elements. The elements collectively cover each of the contours defined by the projections t1 and ti. That coverage may be a mesh in which the elements abut one another. The mesh may be constructed of triangles or other geometric space-filling shapes, e.g., squares. Parameterization of each contour in the meshes results in a correspondence between the elements, e.g., e1_m, in the projection t1 and the elements, e.g., ei_n, in the projection ti. Parameterization can be established by finding the Q between the mesh of ti and the mesh of ti+1 (i.e., two consecutive frames) through morphing. Although a one-to-one correspondence is shown, correspondence between the elements may be two-to-one or another relationship. In FIG. 9, at 106, this is referred to as bijective mapping.

Figure 7C:
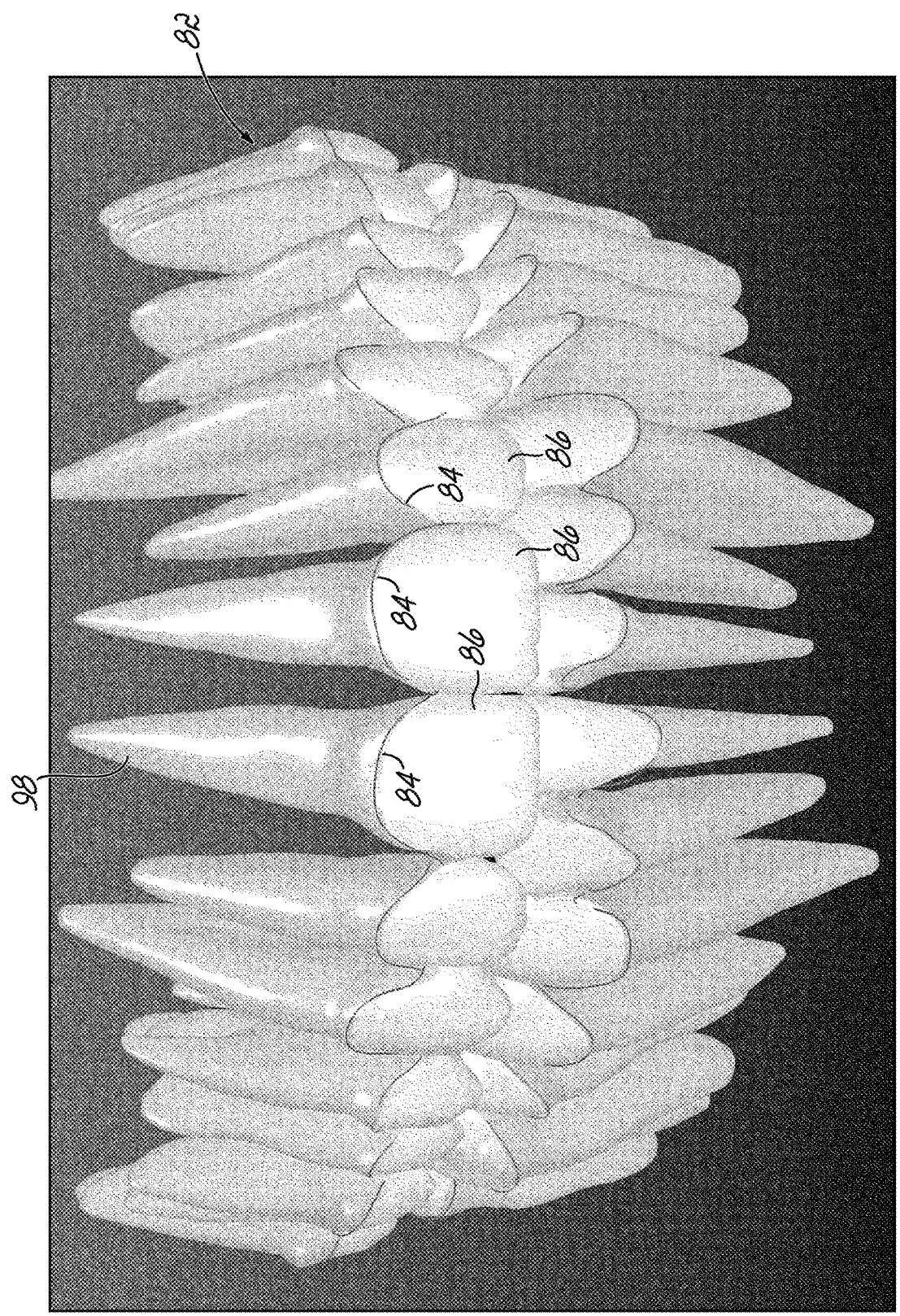
FIG. 7C is a tooth model depicting a gum line.

With reference to FIGS. 7A, 7B, and 9, once bijective mapping is complete, a pixel correspondence map that relates the pixels in the elements e1_m to the pixels in the elements ei_n is produced at 108. Through the pixel correspondence map at 110, the color associated with the element e1_m in the projection t1, which is determined from superimposed tooth 14 of the frontal digital picture 10, is assigned to corresponding element ei_n in projection ti. In essence, the colors in the tooth 14 of the frontal digital picture 10, which determines the colors associated with the elements in the projection t1, may be moved to new locations as determined by the corresponding element in the projection ti.

For example, color information from each pixel associated with each assigned element of the teeth 70 in the frontal picture 72 of FIG. 7A may be relocated to the corresponding elements in the projection ti in the teeth 74 in the modified digital image 76 of FIG. 7B. Each tooth or portion of the tooth observable in the modified smiling image 76 is colored in this manner. Following relocating the colors from one projection to the related projection in the next stage, a modified frontal smiling image based on the intermediate model Ti is produced at 112. The modified digital image includes a rendering of the patient's teeth in their new positions according to that stage of treatment with the color information supplied by the original frontal digital picture 72. The modified digital image 76 thus incorporates the same color information from the frontal picture 72 though that color information may appear in a different pixel in the modified digital image 76. The relocation of that color information is based on the location of the model teeth in the Ti model. No other color information is added to the modified digital image 76. With the above process, individual stages of treatment from the T1 model to and between each intermediate Ti model, and to the T2 model may be morphed into a realistic representation of the result of the proposed orthodontic treatment.

A problem, however, may exist for teeth that are not visible in a pretreatment picture but that become visible during a proposed treatment. This may occur when the orthodontic treatment produces large tooth movements. For example, for severely maloccluded teeth, when the patient's teeth are in their T1 positions, they may not be visible in the frontal picture 10. During treatment, these hidden teeth become visible. The problem then becomes how to color the previously hidden teeth because the original color in the initial frontal picture is unknown.

In one embodiment of the invention, the previously hidden teeth are colored according to pixel colors on the nearest visible tooth in the initial frontal picture. In essence, the color of the a previously hidden tooth is borrowed from its visible nearest neighbor. This scheme assumes that the nearest neighbor teeth have similar color/shading, which is believed to be true for most patients.

Advantageously, morphing in the manner described herein eliminates the subjectivity of manually identifying matching colors and other visual features in the pictures. The colors from the frontal picture are objectively defined according to a pixel correspondence map developed for each stage of tooth movement. This method provides an authentic, realistic modified digital image because color, shade, and light reflections play a significant role in human visual perception and each of these is essentially borrowed in an organized manner from one or more original digital images. This process thus avoids the visual awkwardness associated with manually "photoshopped" photos. Moreover, because the process allows for simulation of a treatment plan and a realistic image of the patient's facial features following treatment according to that treatment plan, orthodontists may prepare a multitude of treatment plans that follow one of several well-established rules, such as smile arc, incisal angle, arch form, anterior-posterior relationship, etc., and the patient and clinician may see an objective result of each of those treatments.

Figure 8:
FIG. 8 is a schematic representation of modification of a patient's lip location and orientation based on the virtual movement of the patient's teeth.

In one embodiment, referring to FIG. 1, morphing may be applied to facial features 24 of the frontal picture 10 shown in FIG. 2. As shown in FIG. 8, it is likely that the patient's teeth will cause changes to the facial features 24 during orthodontic treatment. The morphing technique described above may take into account changes in the patient's features and depict those modifications in the modified digital image. Morphing may be achieved with a geometric algorithm available through the CGAL project.

For example, the patient's gingiva may change location due to tooth movement during orthodontic treatment. For severely maloccluded teeth, the gingiva may not be visible in the initial frontal picture but become visible during treatment. This may be true for example when the patient's incisors are extruded in open bite cases. This type of tooth movement may cause the gingiva to appear at a location at which the gingiva was not visible before. To realistically address the changes in the gingiva position due to tooth movement, gingiva color and hue may be selected from an adjacent area of the gingiva that is visible. That color information may then be copied to a specific location as determined by projecting the T model to the 2-D image plane, described below.

In one embodiment, the model data, for example the T1 model, includes data associated with the location of the patient's gingiva on each of the teeth. This is shown by way of example in FIG. 7C. As shown, the tooth model 82 includes a gum line 84 on each of the model teeth 86. The gum line 84 divides each tooth 86 into a crown portion 88 and a root portion 98. The location of the gum line 84 may be provided in the surface imagery from an intraoral scan. The gum line 84 therefore moves with the teeth as they transition from their positions in the T1 model to their positions in the T2 model.

During morphing, if the gum line 84 is absent in a first T model, because it is located behind the patient's lips, the projection of that tooth to the 2-D image plane does not include the gum line 84. In that instance, one boundary of the projection is the lip line 44 (FIG. 3A). As the gum line 84 emerges during treatment, it becomes a boundary in a projection to the 2-D image plane. A region between the gum line 84 and the inner lip line 44 is then colored according to an average gum color that is copied from the surrounding previously visible gingiva. Later morphing may then simply relocate that color or, alternatively, use the average color and hue in each subsequent modified digital image.

By way of example only, coloring a previously hidden gingiva may include identifying the gingiva in the frontal picture 10 by first subtracting the teeth images from within the boundary of the inner lip line 44. The remaining pixels are sampled and an average of the color and hue are determined.

Other facial features may be morphed between successive T models. By way of example only and not limitation, the patient's lips may move slightly from their original position between their position corresponding to the T1 model to their position corresponding to the T2 model. This is shown by way of example in FIG. 8 in which the dots connected by lines 80 which outline the lips 28 shift location relative to the dots indicating the original location of the lips 28. Each of the sets of dots is shown in FIG. 8 for comparison. The new location and coloring of the lips in a modified digital image may be obtained by the same procedure set out above. However, instead of tooth boundaries (e.g., t1 and ti), the lip boundaries (e.g., l1 and li) would be utilized. In that regard, with reference to FIG. 7B, the pixels in the modified digital image 76 may be reassigned color based on bijective mapping and a pixel correspondence map described with regard to FIG. 9. The patient's face may widen if the dental arch is expanded according to orthodontic treatment.

Figure 10:
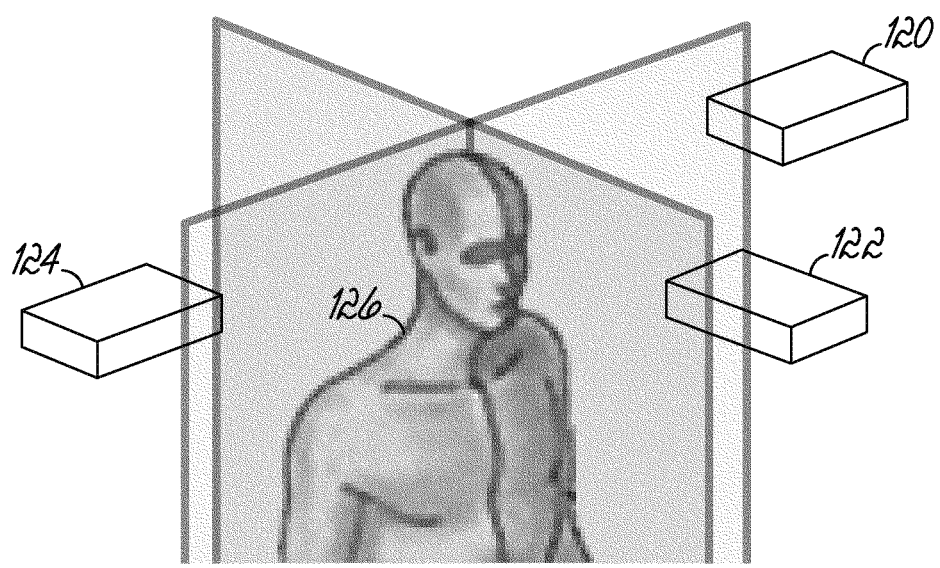
FIG. 10 depicts one embodiment of a camera setup for capturing one or more pictures of a patient.

While the above processes are described with regard to a single frontal picture, embodiments of the present invention are not limited to use of a single frontal picture. Visual simulation of the patient's lateral picture can also be achieved by the methods described herein. In one embodiment, a frontal smiling picture and a lateral picture may be taken simultaneously in a coordinated setting. By way of example only, FIG. 10 depicts an exemplary setting in which multiple cameras 120, 122, and 124 are arranged to capture digital images of a patient 126 at different locations. Each of the images may be of the same scale. It is contemplated that it is possible to achieve matching of the T1 model and each of the pictures from the cameras 120, 122, and 124. This may be achieved simultaneously. Furthermore, the information obtained from the cameras 120, 122, and 124 may be combined.

Figure 10A:
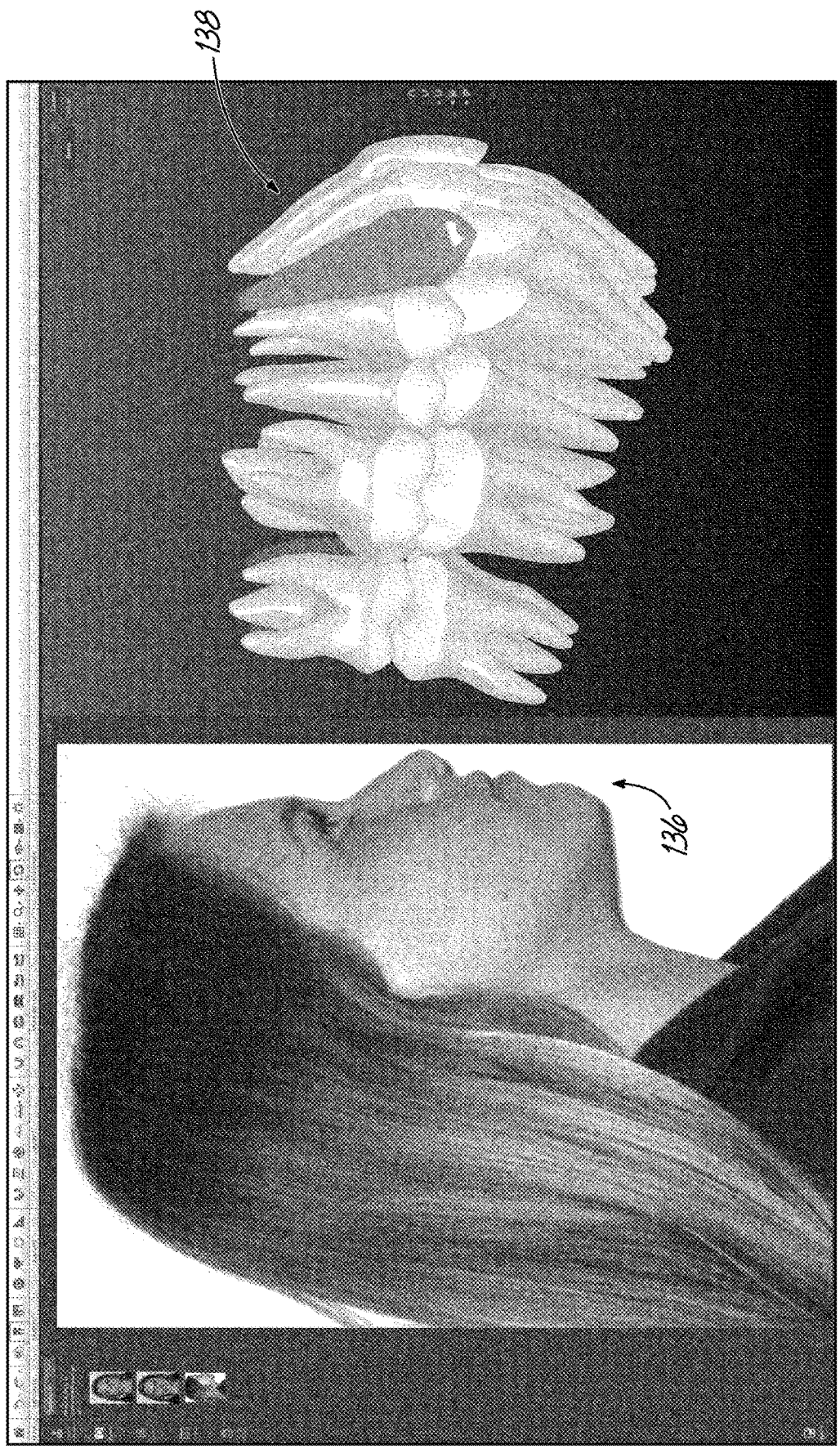
FIG. 10A is a lateral view and 3-D model according to one embodiment.

Advantageously, lateral views and morphing those views may enable changes to the patient's facial features to be observed. For example, and with reference to exemplary lateral view 134 shown in FIG. 10A, the patient's facial profile 136 may change during orthodontic treatment as the model teeth 138 are relocated. This may be of upmost importance to the patient or be a welcome surprise for some patients.

Figure 11:
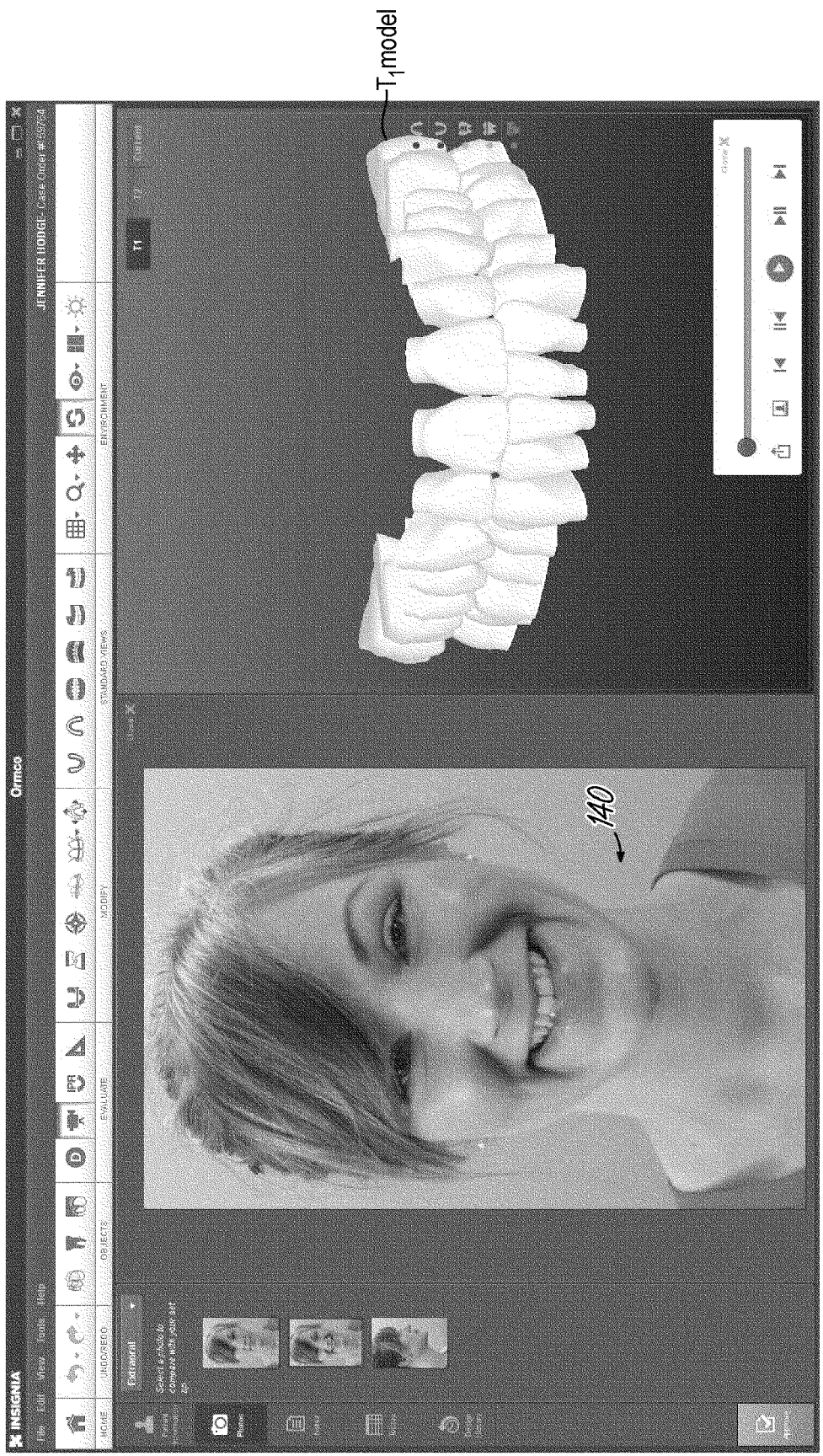
FIG. 11 is a screen shot that depicts a side-to-side correspondence between an initial tooth model (T1) and an initial patient picture.
Figure 12:
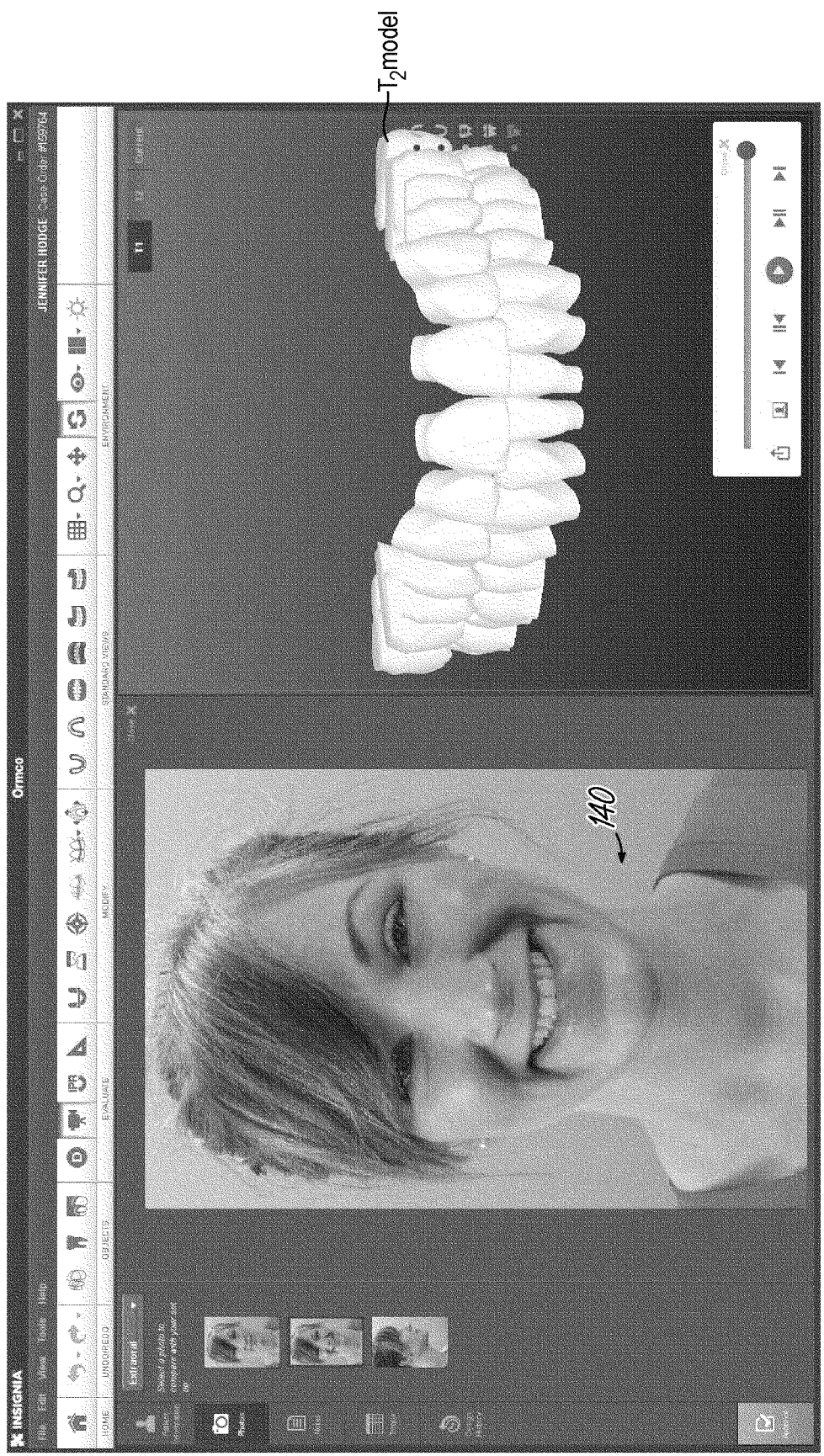
FIG. 12 is a screen shot that depicts a side-to-side correspondence between the T2 model (T2) and a modified picture based on the initial patient picture shown in FIG. 11 incorporating the teeth position and orientation of the T2 model.

By way of additional example of morphing according to embodiments of the invention, and with reference to FIG. 11, a screen shot illustrates a frontal smiling picture 140 of a patient in conjunction with the T1 model corresponding to the patient's teeth shown in the picture 140. Following treatment planning and simulation of teeth movement according to the treatment plan, the modified frontal smiling picture 142 and corresponding T2 model are shown in the screen shot of FIG. 12. The T2 model was produced based on a digital setup using the Insignia™ system. As can be appreciated, the picture 142, though not taken of the patient following treatment and so does not represent reality, appears to be very real. The patient can therefore get a realistic impression of what their post-treatment smile will look like for a given treatment plan.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A method of orthodontic treatment planning comprising:
modifying a digital picture of a patient based on a tooth model produced during simulated orthodontic treatment after movement of at least one model tooth to produce a modified digital image depicting the at least one model tooth after movement, wherein a T1 model is based on captured 3-D data of the patient's teeth, and modifying includes matching a model tooth in the T1 model to a corresponding tooth in the digital picture;
after matching, projecting at least one model tooth in the T1 model to an image plane of the digital picture;
orienting an intermediate T model with the at least one model tooth being moved relative to the at least one model tooth in the T1 model, wherein during orienting, the intermediate T model is placed in the same orientation as the T1 model after matching; and
projecting the at least one model tooth in the intermediate T model to the image plane.

2. The method of claim 1 further comprising:
identifying and extracting at least one facial feature from the digital picture.

3. The method of claim 1 wherein, during modifying, only information from the at least one extracted feature is incorporated into the modified digital image.

4. The method of claim 1 wherein matching includes superimposing the T1 model and the digital picture in digital space.

5. The method of claim 1 wherein the intermediate T model is a tooth model between the T1 model and a T2 model.

6. The method of claim 1 wherein the projections in the image plane each include a plurality of elements, the method further comprising:
parameterizing each element in one projection with a corresponding element in the other projection.

7. The method of claim 6 further comprising:
creating a pixel correspondence map between the parameterized elements.

8. The method of claim 7 wherein the elements are assigned one or more pixels, the method further comprising:
relocating color from one or more pixels in one projection to one or more pixels in the other projection based on the pixel correspondence map.

9. The method of claim 7 further comprising:
rendering the at least one model tooth in the modified digital image with color relocated according to the pixel correspondence map.

10. The method of claim 7 wherein relocating color utilizes only color information found in the digital picture.

11. The method of claim 1 further comprising:
applying a matching transformation to an intermediate T model with the at least one model tooth being moved relative to the at least one model tooth in the T1 model; and
projecting the at least one model tooth in the intermediate T model to the image plane.

12. The method of claim 1 wherein the digital picture is a frontal picture with the patient smiling.

13. The method of claim 1 wherein modifying the digital picture includes modifying at least two digital pictures.

14. The method of claim 13 wherein the at least two digital pictures include a lateral view picture and a frontal view picture.

15. The method of claim 1 wherein during modifying, only color found in the digital picture is used to color the modified digital image.

16. The method of claim 1 wherein modifying includes adding gingiva to the modified digital image at a location at which no gingiva is visible in the digital picture.

17. The method of claim 1 wherein modifying includes changing a facial feature of the patient in the modified digital image relative to the digital picture.

18. A method of orthodontic treatment planning comprising:
modifying a digital picture of a patient based on a tooth model produced during simulated orthodontic treatment after movement of at least one model tooth to produce a modified digital image depicting the at least one model tooth after movement, wherein a T1 model is based on captured 3-D data of the patient's teeth, and modifying includes matching a model tooth in the T1 model to a corresponding tooth in the digital picture;
after matching, projecting at least one model tooth in the T1 model to an image plane of the digital picture;

applying a matching transformation to an intermediate T model with the at least one model tooth being moved relative to the at least one model tooth in the T1 model; and projecting the at least one model tooth in the intermediate T model to the image plane.

\* \* \* \* \*